(12) United States Patent
Specht

(10) Patent No.: US 6,340,173 B1
(45) Date of Patent: Jan. 22, 2002

(54) THREE-POINT SEAT BELT

(75) Inventor: Martin Specht, Feldafing (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/601,595

(22) PCT Filed: Feb. 2, 1999

(86) PCT No.: PCT/EP99/00677

§ 371 Date: Aug. 4, 2000

§ 102(e) Date: Aug. 4, 2000

(87) PCT Pub. No.: WO99/39940

PCT Pub. Date: Aug. 12, 1999

(30) Foreign Application Priority Data

Feb. 4, 1998 (DE) .......................... 198 04 365

(51) Int. Cl.[7] .......................... B60R 21/18; B60R 21/28
(52) U.S. Cl. ........................ 280/733; 280/742
(58) Field of Search ................ 280/733, 742, 280/743.1

(56) References Cited

U.S. PATENT DOCUMENTS

| | | | | |
|---|---|---|---|---|
| 3,682,498 A | * | 8/1972 | Rutzki | 280/733 |
| 3,791,670 A | * | 2/1974 | Lucore et al. | 280/733 |
| 3,801,156 A | * | 4/1974 | Granig | 280/733 |
| 3,820,842 A | * | 6/1974 | Stephenson | 280/733 |
| 3,865,398 A | * | 2/1975 | Woll | 280/733 |
| 3,869,145 A | * | 3/1975 | Takada | 280/733 |
| 3,877,719 A | * | 4/1975 | Lewis et al. | 280/733 |
| 3,905,615 A | * | 9/1975 | Schulman | 280/733 |
| 3,929,205 A | * | 12/1975 | Takada, et al. | 280/733 |
| 3,929,348 A | * | 12/1975 | Lawwill | 280/733 |
| 3,933,370 A | * | 1/1976 | Abe et al. | 280/733 |
| 3,975,258 A | * | 8/1976 | Fox | 280/733 |
| 5,383,713 A | * | 1/1995 | Kamiyama et al. | 280/733 |
| 5,390,953 A | | 2/1995 | Tanaka et al. | 280/733 |
| 5,474,326 A | * | 12/1995 | Cho | 280/733 |
| 6,142,511 A | * | 11/2000 | Lewis | 280/733 |

FOREIGN PATENT DOCUMENTS

| | | | | |
|---|---|---|---|---|
| EP | 0366518 A1 | * | 5/1990 | B60R/22/04 |
| FR | 2200813 | | 4/1974 | |
| JP | 6262997 A | * | 9/1994 | B60R/21/18 |

* cited by examiner

Primary Examiner—Brian L. Johnson
Assistant Examiner—Joselynn Y. Sliteris
(74) Attorney, Agent, or Firm—Jarett Rieger; Markell Seitzman

(57) ABSTRACT

A three-point seat belt comprising an inflatable chest/shoulder belt part and pelvic restraint part. In a transitional area between these two parts, a continuously open gas channel is embodied inside the belt, which channel communicates with the belt interior of both the pelvic restraint part and the chest/shoulder belt part in such a way that a gas is able to circulate.

20 Claims, 2 Drawing Sheets

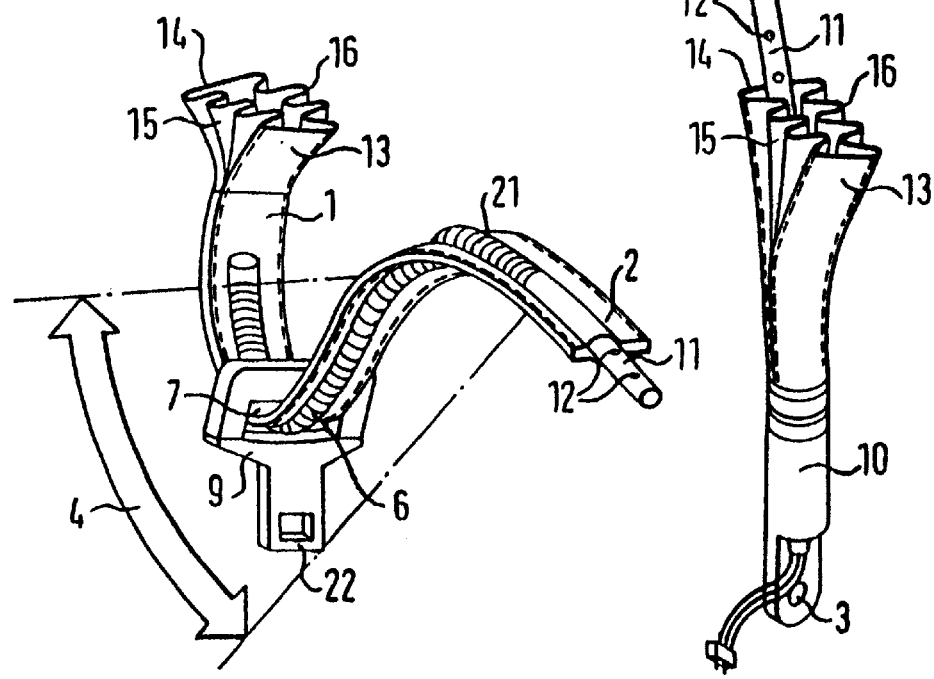
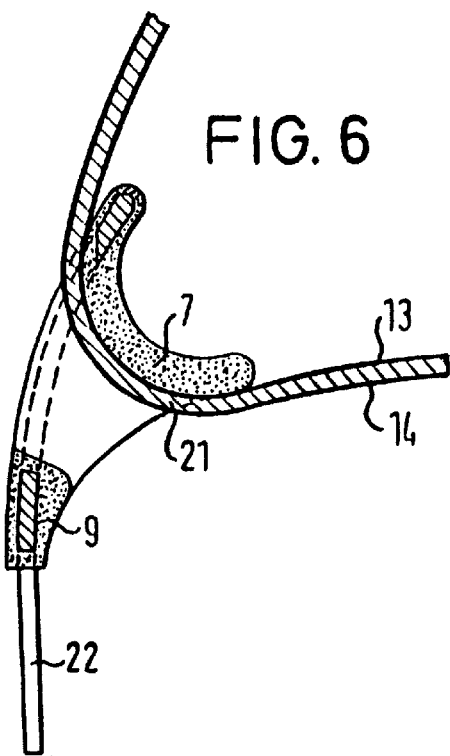
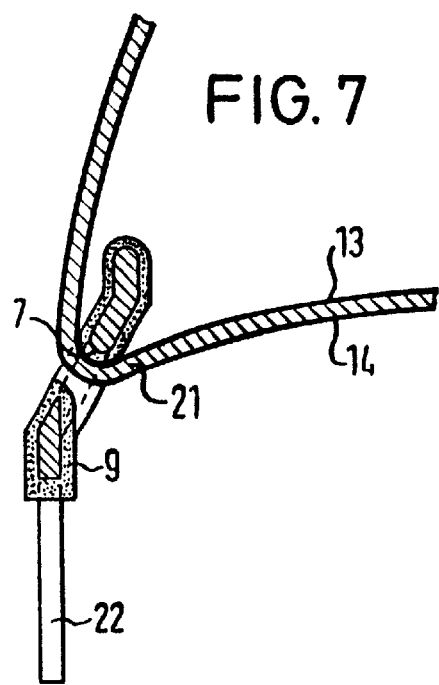

THREE-POINT SEAT BELT

BACKGROUND AND SUMMARY OF THE INVENTION

The invention generally relates to an inflatable seat belt.

In a three-point seat belt of this type, known from U.S. Pat. No. 5,474,326 A, an internal air tube is provided which forms a gas channel for filling the inflatable shoulder and pelvic belt parts. In the non inflated state, the air tube is collapsed so the inflatable seat belt has the form of a flat strip. There is a risk of the collapsed air tube being kinked in the eyelet of the buckle tongue at the deflection point of the seat belt located between the shoulder belt part and the pelvic belt part, so that the shoulder belt region cannot be filled or can only be filled with difficulty.

Measures for increasing the volume of the seat belt in the region of the deflecting eyelet are provided in the region of the deflecting eyelet on the buckle tongue in U.S. Pat. No. 5,383,713 A. No measures are provided on the known seat belt, however, which allow a continuously open gas channel between the shoulder belt region and the pelvic belt region for reliable filling of the belt interiors.

With a three-point seat, known from U.S. Pat. No. 5,390,953, the filling gas is supplied via the buckle and the plug-in tongue inserted into the buckle during application of the belt. This supply of gas from the plug-in tongue to the pelvic belt part and chest belt part necessitates fastening the plug-in tongue on the belt webbing. Adaptation to occupants of different sizes therefore necessitates additional expenditure in the form of a belt retractor at the respective end of the shoulder belt part and pelvic belt part.

In the seat belt known from U.S. Pat. No. 3,929,205, a fastening eyelet is fastened in the transition region, in which pelvic belt part and shoulder belt part converge, by stitching the two converging belt parts to the belt webbing. Adaptation of shoulder and pelvic belt part to different sizes of vehicle occupant is also achieved here by means of belt retractors provided at the respective ends of the shoulder and pelvic belt parts. A continuously open gas flow connection between the belt interiors of the shoulder belt part and pelvic belt part is created between the two belt parts by a hose guided next to the stitching. The gas is supplied via the hose which extends through the shoulder belt part. For this purpose, the hose is deflected round a deflection point provided in the region of the belt retractor at the upper end of the backrest. A weight is provided for achieving taut hose guidance during application and removal of the seat belt.

The seat belt known from U.S. Pat. No. 3,975,258 consists of a hose material which forms a continuous internal space for the individual belt parts. During normal operation, a vacuum is produced in the interior of the belt in order to obtain a flat belt shape. Springs surrounding the hose material enable the belt to be brought into the hose shape and air is supplied for filling the hose when the vacuum is removed, for example as the result of excessive deceleration of the vehicle.

The three-point seat belt known from U.S. Pat. No. 3,682,498 is formed statically without a belt retractor. The chest/shoulder belt region and the pelvic belt region are supplied with filling gas via a common valve point from a compressed air bottle. Belt parts which reduce the contact pressure of the seat belt on the vehicle occupant and also provide protection from impacts by parts of the vehicle such as steering wheel, dashboard and the like are to be inflated in the chest/shoulder belt region and pelvic belt region. The way in which the seat belt is attached to the vehicle body when applied on the buckle side is not shown in detail.

EP 0 366 518 A1 also discloses an inflatable three-point seat belt which is integrated into a vehicle seat and in which the gas for the filling gas is supplied at an end of the pelvic belt part connected to the end fitting provided on the vehicle body. The pelvic belt part is filled first of all, and the filling gas is then conveyed round a deflection point provided in the other end region of the pelvic belt in order also to fill the chest/shoulder belt region. In order to create a flow of gas through the deflection point during the filling of the two belt regions, the belt webbing is held at this point in a special guide at the end of the pelvic belt part on which a buckle is normally provided. The special guidance or mounting of the deflection point between pelvic belt part and chest/shoulder belt part differs from the conventional design of a buckle and provides for the belt webbing a deflection point into which the belt webbing is inserted directly and becomes substantially omega-shaped during filling. This arrangement differs considerably from the conventional commercial fixing of the webbing by means of a plug-in part provided on the webbing, in particular in the form of a tongue, which is plugged into a buckle provided on the vehicle body.

It is the object of the invention to provide a three-point seat belt of the type mentioned at the outset, in which the three points ensuring guidance and fastening of the seat belt on the vehicle body when the belt is applied are equipped with conventional aids, and reliable filling of the chest/shoulder belt region and of the pelvic belt is achieved.

The gas channel which is provided in the interior of the belt, at least at a deflection point on a plug-in part which can be plugged into a buckle, in particular a plug-in tongue, can consist of a piece of hose which has relatively high rigidity in the radial direction so that the opening cross-section formed by the gas channel does not collapse when the seat belt webbing is deflected round the deflection point, but rather this opening cross-section is maintained between the pelvic belt part and the chest/shoulder belt part when the seat belt is applied, i.e. when the plug-in part, in particular the plug-in tongue, is plugged into a buckle provided for this purpose in the conventional manner on the vehicle body. In this way, a continuous flow connection is maintained through the gas channel between these two belt parts both in the situation where the seat belt is retracted into its parked or stowed position and in the applied situation. As the gas channel is arranged in the transition region between pelvic belt part and chest/shoulder belt part while allowing for the necessary dimensions of a 5th percentile woman and a 95th percentile man, the gas channel in the parked or stowed position is in the belt part which is guided substantially rectilinearly from the bottom end fitting to the deflecting fitting provided roughly at shoulder height on the vehicle. In the parked or stowed position, therefore, the gas channel is not subjected to bending stresses.

A rigid pipe elbow or a hose-like material which is preferably equipped with a reinforcing insert, in particular of helical shape, for example a helical spring, in the region of the deflection point can be used to form the gas channel. This ensures that the hose-like material forming the gas channel, when returned from the applied arrangement guided round the deflection point on the plug-in part (plug-in tongue), automatically moves into the position substantially in a rectilinear shape adapted to the belt webbing in the parked or stowed position owing to its flexibility. This can be achieved by means of a helical spring which stores the rectilinear shape mechanically. The helical reinforcement (helical spring) is preferably pressed against the internal face of the hose, which can be designed as a delivery hose for this purpose.

In a preferred embodiment, the filling gas is supplied at the end of the pelvic belt part connected to the end fitting fastened to the vehicle body. The gas supply can be formed by a gas generator, in particular a hybrid gas generator, which supplies a cold gas. However, it is also possible to design the gas supply means as a gas-tight coupling which is attached via a gas line to a gas generator, in particular a cold gas generator, for supplying a cold gas. The gas supply means (gas generator or gas-tight coupling) is preferably rigidly connected to the end fitting so that the gas supply means together with the end fitting is invariably adapted to the current strapped-in state produced on application of the seat belt.

The gas channel provided at the deflection point at one end of the pelvic belt is preferably connected to the gas supply means provided at the other end of the pelvic belt via a flexible gas line which can be formed by a flexible hose. The gas channel and the gas line can consist of a single piece of hose, wherein the hose wall can be reinforced in the radial direction by a reinforcing insert, which can preferably be a metal helix (helical spring) in the region of the deflection point to form the gas channel, as already mentioned hereinbefore.

This ensures that the chest/shoulder belt part is inflated first of all in the event of an accident. The belt interior of the chest/shoulder belt can optionally be connected to inflatable cushions which fulfil additional protective functions such as protection from lateral impacts in the head and thorax region. A rapidly increasing counter-pressure in the chest/shoulder belt part is achieved through the gas channel in the region of the deflection point between pelvic belt and chest/shoulder belt. The pelvic belt region is then filled via the gas channel and optionally via an inflated belt region at the deflection point.

Openings which are still closed during filling of the chest/shoulder belt region, in particular by the applied belt webbing fabric, can preferably be provided in the gas line which is guided through the pelvic belt part to the gas channel. Once the counter-pressure has built up in the chest/shoulder belt region owing to the filling gas (cold gas) which has entered, filling gas is blown out through the openings laterally into the pelvic belt region, the belt webbing fabric being pressed away from the openings.

The quantity of filling gas supplied by the cold gas generator can be calculated such that a holding time of about 120 ms is achieved. This holding time can be shorter or longer, depending on the requirements. If the maximum load on the occupant due to the seat belt occurs after about 60 ms in the event of an accident, it may be advantageous if the inflated seat belt is softer, i.e. the filling pressure decreases and the risk of injury is therefore reduced. With the invention, the maximum filling pressure is achieved in the inflatable belt regions after only 20 ms. Lateral impact protection is therefore also achieved, in particular, in the head region owing to appropriate dimensioning of the filling volume, in particular in the shoulder region.

An airbag cushion which is integrated in a fixed position in the inflatable pelvic belt part can optionally be provided to protect the pelvic bone. During a lateral intrusion of the vehicle structure, this airbag cushion has a protective function for a 5th percentile woman to a 95th percentile man.

BRIEF DESCRIPTION OF THE DRAWING

Embodiments of the invention will be described in more detail with reference to the figures, in which:

FIG. 4 shows a detail of the embodiment in the transition region between pelvic and chest belt part;

FIG. 5 shows a detail of the embodiment in the region of a gas supply means;

FIG. 6 shows an embodiment of a deflection point with enlarged deflection radius between pelvic and chest belt part; and FIG. 7 shows a further embodiment of a deflection point which has a conventional construction.

DETAILED DESCRIPTION OF THE DRAWINGS

Figure 1:
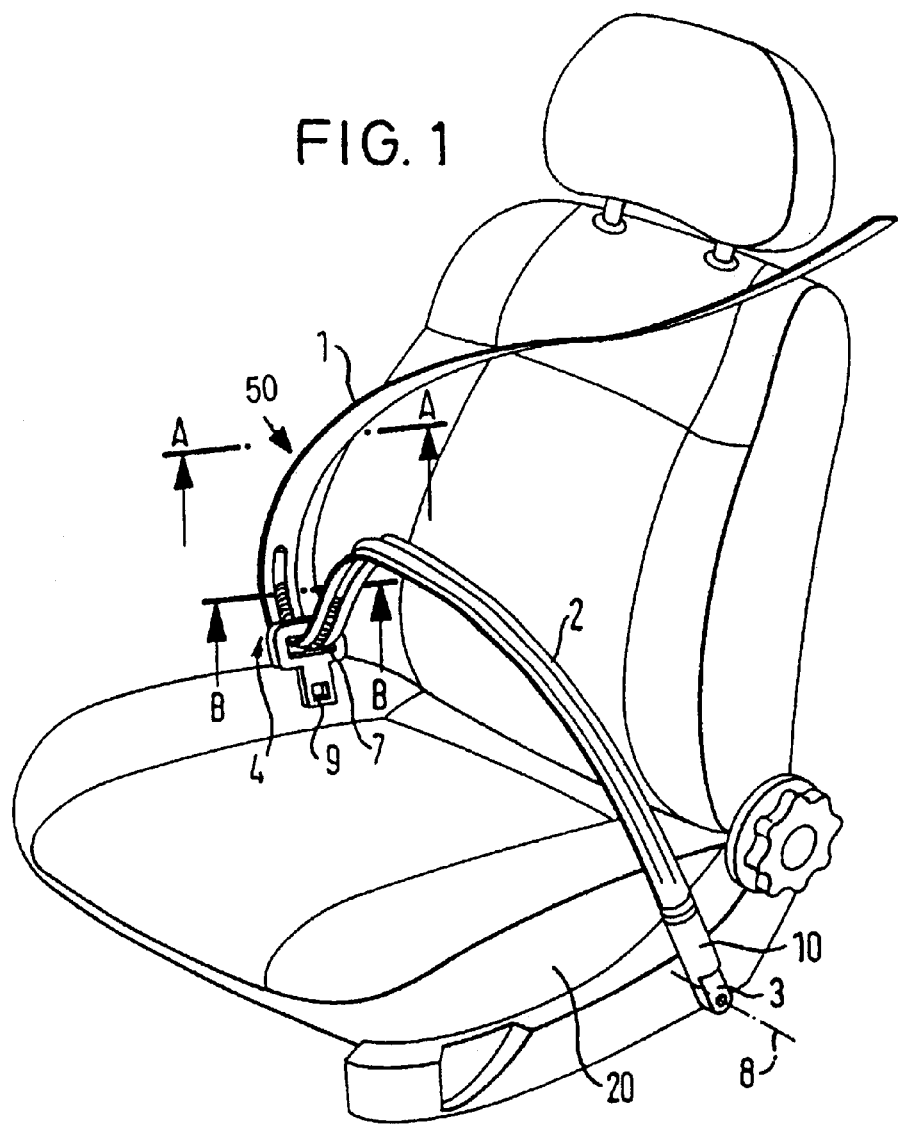
FIG. 1 shows an embodiment of a region of a vehicle seat in a perspective arrangement.

The embodiment shown in FIG. 1 comprises a three-point seat belt in the region of a vehicle seat 20. The seat belt 50, which can be formed of a continuous piece of seat belt or seat belt webbing, possesses a pelvic or lap belt part 2 and a chest/shoulder belt part 1. One end of the pelvic belt part 2 is rigidly connected to the vehicle body via an end fitting 3. The end fitting 3 can be pivoted round an axis 8 rigid with the vehicle, so that adaptation to the respective strapped-in situation is achieved. At the other end of the pelvic belt part 2 there is a plug-in part 9 which can be plugged into a buckle. The plug-in part 9 is designed in the form of a plug-in tongue. A deflecting eyelet which forms a deflection point 7 for the seat belt webbing is provided on the plug-in tongue. During application of the seat belt, this deflection point 7 is located in a transition region 4 between the chest belt part 1 and the pelvic belt part 2. The deflection point 7 moves within this transition region 4 depending on whether the strapped-in vehicle occupant is the size of a 5th percentile woman or a 95th percentile man. FIGS. 6 and 7 show embodiments of the deflection point 7.

The chest/shoulder belt part 1 is guided to a deflection point, not shown in detail and formed in a known manner, on the vehicle body, for example on a B-column of the motor vehicle or in a vechicle seat, roughly at the shoulder height of the vehicle occupant. From there the belt webbing is continued in a known manner to a belt retractor which is also not shown and is fastened on the vehicle body. This guidance and fixing of the seat belt corresponds to conventional fixing and guidance of a three-point seat belt in a motor vehicle.

Figure 2:
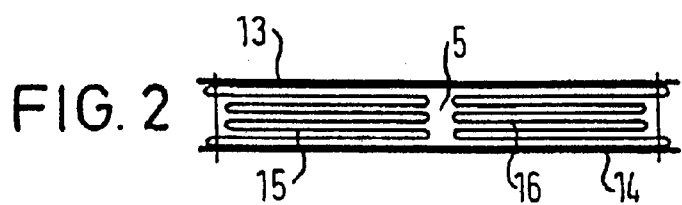
FIG. 2 is a sectional view along section line A—A in FIG. 1.
Figure 3:
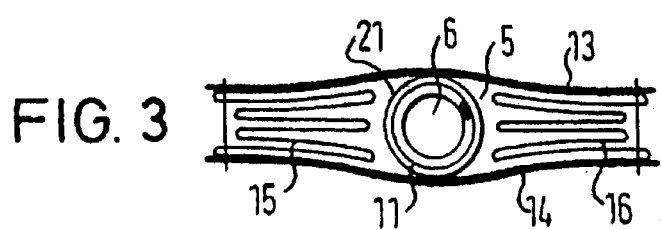
FIG. 3 is a sectional view along section line B—B in FIG. 1.

In the embodiment illustrated, the chest/shoulder belt part 1 and the pelvic belt part 2 are inflatable in design. As shown, in particular, in the cross-sectional views in FIG. 2 and 3, the seat belt webbing possesses two belt webbings, namely a top belt 13 and a bottom belt 14. These two flat belt webbings extend in parallel and form an inflatable belt interior 5 inbetween. FIG. 2 shows the cross-section in the region of the chest/shoulder belt part 1. FIG. 3 shows the cross-section in the transition region 4. At the sides, the inflatable belt interior 5 is limited by lengths of fabric 15 and 16 which are stitched in the respective edge region of the top and bottom belt 13, 14. The lengths of fabric are folded during the normal operation illustrated When the interior of the belt is inflated the edge stitches break to allow the fabric 15 and 16 to expand. Preferably, two-sided zigzag folding which is symmetrical about the vertical longitudinal centre plane of the belt webbing is adopted. The lengths of fabric 15, 16 can be an airbag fabric which is stitched or woven to the top and bottom belt 13, 14.

The top belt 13 and the bottom belt 14 can be formed from a seat belt fabric which is thinner than the conventional seat belt fabric. The total breaking load of the two belt webbings 13, 14 corresponds to the breaking load of a conventional, widely used seat belt webbing.

A gas supply means 10 is used to inflate the seat belt parts (chest/shoulder belt part 1 and pelvic belt part 2). The gas supply means 10 can be provided rigidly on the end fitting 3. The gas supply means 10 can be designed as a gas generator, preferably a cold gas generator, which contains the filling gas in compressed form. However, it is also possible to use, as filling gas, a warm gas produced by a pyrotechnic gas generator. As the gas supply means 10 is arranged pivotally round the axis 8 with the end fitting 3, as also shown in FIG. 5, adaptation to the respective strapped-in state adopted by the pelvic belt part 2 in each case occurs. This prevents the connection between the gas supply means 10 and the pelvic belt part 2 or a gas line 11 extending through the pelvic belt part 2 from being damaged or interrupted.

The gas line 11, which can be designed as a flexible hose, is guided through the inflatable belt interior 5 of the pelvic belt 2 into the transition region 4 between chest and pelvic belt part, as shown in the cross-sectional view in FIG. 3. In the transition region 4, the hose-like wall material of the gas line 11 possesses a reinforcing insert 21 which, in the embodiment illustrated, has a helical shape and can be formed, for example, by a helical spring made of steel. As a result, a gas channel 6 with an opening cross-section which is smaller, in particular substantially smaller, than the diameter of the belt interior 5 which can be filled with filling gas when the belt parts are inflated is created in the transition region 4 defined by the distance for the strap-in geometry between 5th percentile woman and 95th percentile man, as already mentioned hereinbefore. This gas channel 6 with its opening cross-section is also maintained when the plug-in part 9 is plugged into the seat belt buckle provided for this purpose in the vehicle when the seat belt is applied. The gas channel 6 is maintained, in particular in the region of the deflection point 7 produced within the transition region 4 in the respective strapped-in situation. This occurs owing to the radially reinforcing effect of the reinforcing insert 21. This reinforcing insert 21 is designed in such a way that it is deflected round the deflection point 7 substantially in parallel with the top belt 13 and the bottom belt 14, the opening of the crosssection of the gas channel 6 being maintained. When the seat belt is removed and brought back to the parked or stowed position, it returns to a rectilinear or straight shape between the deflecting fitting 3 and the deflection point roughly at shoulder height owing to the retracting force of the seat belt webbing exerted by the restoring spring of the seat belt retractor. The resiliently designed reinforcing insert 21 e.g. helical spring, has a restoring force which tends to return the insert 21 to a flat or straight shape after applied forces are withdrawn. Owing to this restoring force which is stored mechanically in the reinforcing insert, the reinforcing insert 21 is returned substantially to its axially rectilinear shape. As the remainder of the gas line 11, extending through the belt interior 5 of the pelvic belt part 2, is sufficiently flexible in design, this gas line part also assumes a substantially rectilinear shape.

As shown, in particular, in FIGS. 1 and 4, the gas line 11 extends into the chest/shoulder belt part 1 with an extension beyond the transition region 4. A continuous gas flow connection is thus maintained between the gas supply means 10 provided in the region of the end fitting 3 and the belt interior 5 of the chest/shoulder belt part 1.

In the event of an accident, the gas supply means 10 is activated, triggered, for example, by an inertia sensor which is sensitive to the vehicle, and a filling gas, in particular a cold gas, is introduced through the gas line 11 and via the gas channel 6, which is also open when the seat belt is applied, into the belt interior 5 of the chest/shoulder belt part 1. Further moulded-on gas cushions, which are connected to the belt interior 5 and provide protection from impacts, for example lateral impacts, can optionally be filled with the filling gas. A counter-pressure, which also causes the filling of the pelvic belt part, builds up within a very short time during the filling of the chest/shoulder belt part 1. openings 12 through which the filling gas is blown out laterally into the belt interior 5 of the pelvic belt part 2 can be provided in the gas line 11 for this purpose. During the filling of the chest/shoulder belt part 1, these openings are closed, in particular by the fabric of the pelvic belt part resting on the openings 12. In particular when cold gas is used, the cold gas initially spreads in the direction in which the lowest counter-pressure prevails, i.e. through the opening cross-section of the gas line 11 and the gas channel 6, so that the belt interior 5 of the chest/shoulder belt part 1 is filled first and the counter-pressure for filling the pelvic belt part 2 is then formed. This region is also filled completely as the counter-pressure increases.

FIGS. 6 and 7 show embodiments of the plug-in part 9. The plug-in part 9 has a plug-in tongue 22 of conventional design. A deflection point 7 which has a relatively large radius of curvature in the embodiment in FIG. 6 is also provided on the plug-in part 9. The radius of curvature of the deflection point 7 is smaller in design in the embodiment in FIG. 7 and can be formed by a conventional deflecting edge, of the type used in plug-in parts which are in use.

What is claimed is:

1. A three-point seat belt system in a vehicle comprising: a seat belt (50) having a shoulder belt part and a pelvic belt part, each of the shoulder belt part and the pelvic belt part including an inflatable interior volume of a determinable cross-section, the seat belt is received through a deflection point of a tongue and the tongue is receivable within a buckle, wherein that part of the seat belt extending on either side of the tongue defines a transition region which extends on one side thereof to the shoulder belt part and on another side thereof to the pelvic belt part;

gas supply means (10) for providing gas to inflate the belt; the seat belt which forms the shoulder and pelvic belt parts (1, 2) and the transition region (4) comprises a continuous, inflatable belt interior (5); and a gas channel (6) is arranged at least in the interior (5) of the transition region (4) for forming a continuous gas flow connection between interiors of the shoulder belt part (1) and the pelvic belt part (2), wherein a gas line extends from the gas supply means and forms the gas channel, the gas line includes openings (12) which are closed when the filling gas is supplied to the shoulder belt part (1) and are opened when the pelvic belt part (2) is filled.

2. Three-point seat belt system according to claim 1, wherein the gas supply means (10) is provided at an end of the pelvic belt part (2) connected to an end fitting (3) fastened on a vehicle body.

3. Three-point seat belt system according to claim 1, wherein a gas line (11) with which the shoulder belt part (1) and the pelvic belt part (2) can be filled extends from the gas supply means (10) and forms the gas channel (6).

4. Three-point seat belt system according to claim 3, wherein the gas line (11) consists of a flexible material which can move in concert with the pelvic belt part (2).

5. Three-point seat belt system according to claim 2, wherein the gas supply means (10) is fastened on the end fitting (3) and movable therewith.

6. Three-point seat belt system according to claim 3, wherein the openings (12) are initially obstructed by belt material resting on the gas line (11) and opened as the belt is inflated.

7. Three-point seat belt system according to claim 1, wherein a wall material forming the gas channel (6) is sufficiently stiff in the radial direction to prevent the gas channel from collapsing.

8. Three-point seat belt system according to claim 1 wherein at least a portion of the gas channel (6) has a reinforcing sleeve or insert of helical shape.

9. Three-point seat belt system according to claim 7 wherein a pipe elbow is provided to form the gas channel.

10. Three-point seat belt system according to claim 8, wherein the reinforcing insert (21) has a spring force which resists bending and brings a bent reinforcing insert back into a generally linear shape.

11. Three-point seat belt system according to claim 1 wherein the gas channel (6) is formed by a continuous hose.

12. Three-point seat belt system according to claim 1 wherein a seat belt webbing, at least in inflatable portions thereof, is formed by a top belt (13) and a lower belt (14) connected by an expandable portion (15, 16).

13. Three-point seat belt system according to claim 12, wherein the expandable portion includes two strips of fabric (15, 16).

14. Three-point seat belt system according to claim 1 wherein the gas supply means supplies one of cold gas and hot gas.

15. Three-point belt system according to claim 1 wherein the deflection point of the tongue has a radius that is sufficiently large so as not to constrict the gas channel.

16. Three-point belt system according to claim 1 wherein a cross-section of the gas channel is smaller than the cross-section of the inflated seat belt parts.

17. Three-point seat belt system according to claim 3 wherein the gas line includes openings (12) which are closed when the filling gas is supplied to the shoulder belt part (1) and are opened when the pelvic belt part (2) is filled to permit the shoulder belt part to inflate before the pelvic belt part inflates.

18. Three-point seat belt system according to claim 11, wherein a protective sleeve or insert (21) covers a portion of a gas line (11) that extends through the tongue.

19. Three-point seat belt system according to claim 18, wherein the protective sleeve or insert (21) has a spring force which opposes bending and tends to bring a bent protective reinforcing insert back into an unstressed shape.

20. Three-point seat belt comprising shoulder and pelvic belt parts (1, 2) of a seat belt webbing which are inflatable, at least in a shoulder belt region;

a gas channel (6) with an opening cross-section which is smaller than a cross-section of an inflated belt interior of the belt parts at a point of deflection (7) of a tongue (9) which can be plugged into a buckle and at which the seat belt webbing is deflected in a transition region (4) from the pelvic belt part (2) to the shoulder belt part (1) when the seat belt is applied, and produces a gas flow connection between the belt interiors of the shoulder belt part (1) and the pelvic belt part (2);

a gas supply means (10) in an end region of the pelvic belt part (2) remote from the transition region (4); and a continuous, fillable belt interior (5) in the seat belt webbing (13, 14) forming the shoulder and pelvic belt parts (1, 2) and the transition region (4); wherein the seat belt webbing (13, 14) is guided displaceably around the deflection point (7) in its transition region (4); wherein the gas channel (6) at least in the belt interior (5) of the transition region (4) guided round the deflection point (7) forms a radially reinforced gas line (11) via whose opening section the belt interiors of the shoulder belt part (1) and the pelvic belt part (2) can be inflated, wherein the gas line includes openings (12) which are closed when filling gas is supplied to the shoulder belt part (1) and are opened when the pelvic belt part (2) is filled.

* * * * *